United States Patent [19]

Johnson

[11] Patent Number: 5,143,788

[45] Date of Patent: Sep. 1, 1992

[54] COATING COMPOSITION OF POLYESTERURETHANE AND MULTIFUNCTIONAL EPOXY COMPOUND

[75] Inventor: Jeffery W. Johnson, Wilmington, Del.

[73] Assignee: E. I. Du Pont de Nemours and Company, Wilmington, Del.

[21] Appl. No.: 795,318

[22] Filed: Nov. 20, 1991

Related U.S. Application Data

[62] Division of Ser. No. 449,006, Dec. 12, 1989.

[51] Int. Cl.$^5$ .............................................. B32B 27/40
[52] U.S. Cl. .................. 428/423.3; 428/421; 428/423.7; 428/424.2; 428/424.4; 428/473.5; 428/483; 428/517; 428/519; 428/520
[58] Field of Search ............... 428/423.3, 424.2, 424.4, 428/517, 519, 520, 421, 473.5, 483, 423.7

[56] References Cited

U.S. PATENT DOCUMENTS

| | | | |
|---|---|---|---|
| 3,479,310 | 11/1969 | Dieterich et al. | 525/457 |
| 3,971,745 | 7/1976 | Carlson et al. | 260/29.2 TN |
| 4,533,703 | 8/1985 | Kordomeros et al. | 525/440 |
| 4,650,718 | 3/1987 | Simpson et al. | 428/413 |
| 4,681,811 | 7/1987 | Simpson et al. | 428/413 |
| 4,703,101 | 10/1987 | Singer et al. | 528/87 |
| 4,720,405 | 1/1988 | Carson et al. | 427/410 |
| 4,812,535 | 3/1989 | Dervan et al. | 525/450 |
| 4,882,379 | 11/1989 | Pankrantz | 524/590 |
| 4,902,754 | 2/1990 | Kordomenos | 525/440 |

FOREIGN PATENT DOCUMENTS 1339149 4/1975 United Kingdom .

*Primary Examiner*—Paul J. Thibodeau
*Assistant Examiner*—D. S. Nakarani
*Attorney, Agent, or Firm*—Hilmar L. Fricke

[57] ABSTRACT

A coating composition particularly useful in for forming exterior finishes on the exterior of vehicle parts, the binder of the composition which is in an organic liquid carrier is a polyesterurethane and a multifunctional epoxy compound; wherein
  the polyesterurethane is formed by reacting a hydroxy functional polyester with a hydroxy containing carboxylic acid and an organic polyisocyanate and
  the multifunctional epoxy resin is an aliphatic, cycloaliphatic or aromatic epoxy resin; coated parts, laminates and composite structures made with the coating composition are also part of the invention.

14 Claims, 3 Drawing Sheets

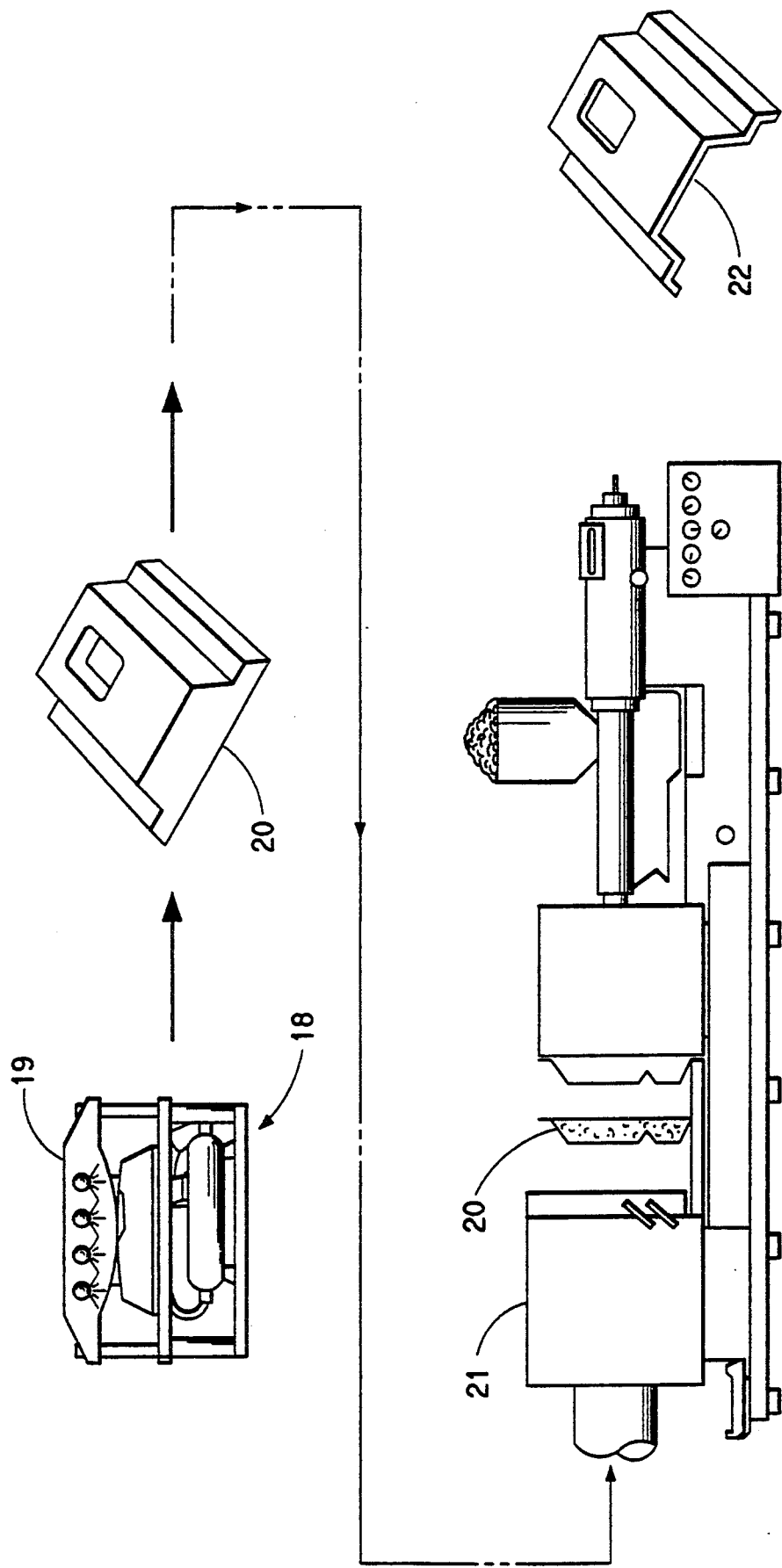

COATING COMPOSITION OF POLYESTERURETHANE AND MULTIFUNCTIONAL EPOXY COMPOUND

This is a division of application Ser. No. 07/449,006, filed Dec. 12, 1989, allowed.

BACKGROUND OF THE INVENTION

This invention is related to a coating composition and in particular to a coating composition that is useful as a formable finish for composite structures made via several different processes.

Many exterior auto and truck parts such as fenders, quarter panels, doors, trim parts, bumpers, fender extensions and other exterior parts are formed of moldable plastic or polymeric materials such as thermoplastic polymers or reinforced polymeric materials. These parts are currently being used because of their corrosion resistance, resistance to permanent deformation on impact and are lighter than metal parts which they replace. Typical moldable thermoplastic polymers that are being use for these parts and that can be easily and economically molded are, for example, polypropylene, polyethylene, ABS (acrylonitrile-butadiene-styrene polymers), polystyrene, and styrene-acrylonitrile copolymers. The lighter weight of these parts favorably affects the weight and fuel economy of the auto or truck made with these parts. Because of these advantages, these plastic parts are replacing metal parts of automobiles and trucks. Another advantage of the moldable polymers is that more intricate designs can be made in comparison to sheet metals giving the auto makers increased freedom in design of autos.

To reduce air pollution, automobile and truck manufactures need to reduce the amount of painting in the manufacturing process. It would be desirable to have a plastic auto or truck part that has a high quality durable and weatherable finish whose color matches any painted sheet metal used to make the auto or truck and that can be attached directly in the assembly process and does not require further priming or painting. This would eliminate the costly and time consuming painting process with the associated pollution problems.

Plastic automobile and truck parts can be made and finished by a lamination coating process, in-mold coating of a part while it is being formed or by a shrink wrap process in which a coated plastic film is shrink-wrapped about a plastic part. A typical shrink wrap process is shown in Mentzer et al U.S. Pat. No. 4,838,973 issued Jun. 13, 1989. Any finish used in the aforementioned processes would have to withstand the processing conditions including heat and deformation and still form a finish useful for the exterior of automobiles and trucks. Attempts have been made to use and reformulate conventional exterior acrylic lacquers and thermosetting acrylic enamels that traditionally have been used on plastic substrates but without success since process conditions used in the aforementioned processes are too severe and adversely affect the resulting finish by causing cracks, distortions and degradation of the finish.

It is an objective of this invention to provide a practical and economical coating composition that can be used in a variety of processes used for decorating plastic substrates that forms a finish that can be thermoformed and molded and results in a finish having an excellent overall appearance, is durable and weatherable and is a useful exterior finish for automobiles and trucks.

SUMMARY OF THE INVENTION

A coating composition containing about 10-70% by weight binder solids and correspondingly about 90-30% by weight organic liquid carrier, wherein the binder contains (1) a carboxyl functional polyesterurethane having a weight average molecular weight of about 80,000 to 200,000 and is formed by reacting a hydroxy functional polyester, a hydroxy containing carboxylic acid and an organic polyisocyanate, wherein the hydroxy functional polyester is the reaction product of a diol of the formula HOROH and an acid of the formula $R^1(COOH)_2$ or an anhydride of such an acid where R is an aliphatic, cycloaliphatic or aromatic hydrocarbon radical having 2-6 carbon and $R^1$ is an aliphatic, cycloaliphatic or aromatic hydrocarbon radical having 6-12 carbon atoms and (2) multifunctional aliphatic, cycloaliphatic or aromatic epoxy compound; wherein the epoxy compound crosslinks with the polyesterurethane upon curing of the composition.

A composite useful as an exterior vehicle body part using the above composition and a laminate or face sheet useful for making a composite also are part of this invention.

BRIEF DESCRIPTION OF THE DRAWINGS

FIG. 4 shows the process for making a composite from the laminate or face sheet.

DETAILED DESCRIPTION OF THE INVENTION

Figure 1:
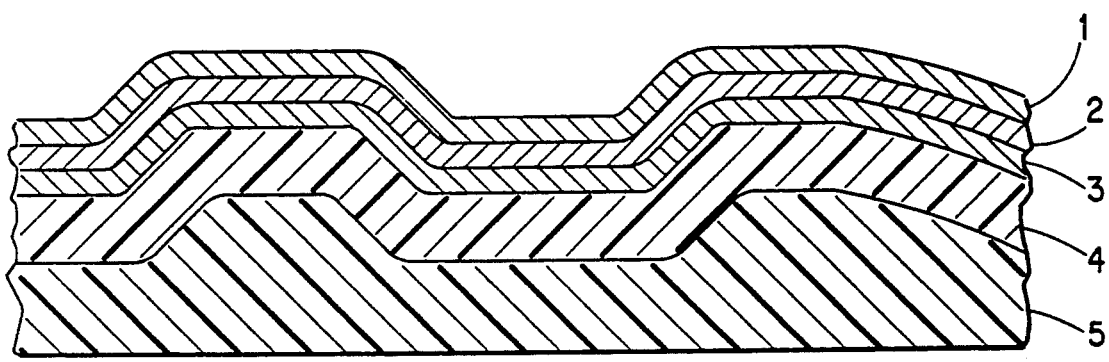
FIG. 1 shows a cross section of the composite made with the novel coating composition.

The coating composition has a film forming binder content of about 10-70% by weight and correspondingly, about 90-30% by weight of an organic liquid carrier. The composition may be used as a clear coating composition which may contain a small amount amount of pigment to eliminate color such as yellowing. A clear coat of the composition can be applied to a pigmented basecoat of the composition or a pigmented basecoat of another composition to form a clear coat/basecoat finish which is widely used for automobiles and trucks.

The composition may be pigmented and used as a monocoat or as a basecoat of a clear coat/basecoat finish. The composition has excellent adhesion to those polymeric substrates used to form laminates and composites and to a variety of other substrates such as cold rolled steel, phosphatized steel, steel coated with conventional primers such as electrodeposition primers that typically are crosslinked epoxy polyesters and various epoxy resins, alkyd resin repair primers, plastic substrates such as polyester reinforced fiber glass, reaction injection molded urethanes, partially crystalline polyamides and the like.

The coating composition with proper pigmentation also can be used as a primer over cold rolled steel, treated steel such as phosphatized steel or the aforementioned plastic substrates. The primer provides a surface to which a topcoat will adhere such as topcoat of the coating composition of this invention.

The film forming binder of the composition contains about 80-99% by weight of a carboxyl functional polyesterurethane and about 1-20% by weight of multifunctional aliphatic, cycloaliphatic or aromatic epoxy compound. Preferably, the binder of the composition contains 90-98% by weight of the carboxyl functional polyesterurethane and about 2-10% by weight of the multifunctional epoxy compound.

The carboxyl functional polyesterurethane has a weight average molecular weight of about 80,000-200,000 and a number average molecular weight of about 5,000-30,000 measured by gel permeation chromatography using polystyrene as the standard.

The polyesterurethane is the reaction product of a hydroxy functional polyester containing both hydroxy and carboxy functional groups and an organic polyisocyanate. The hydroxy functional polyester is the reaction product of a diol of the formula HOROH where R is an aliphatic, cycloaliphatic or aromatic hydrocarbon radical that has 2-6 carbon atoms and a dicarboxylic acid of the formula $R^1(COOH)_2$ or an anhydride of such an acid where $R^1$ is an aliphatic, cycloaliphatic or aromatic hydrocarbon radical having 6-12 carbon atoms.

The hydroxy functional polyester is formed by conventional techniques in which the diol and acid are charged into a conventional polymerization vessel and reacted at about 150°-240° C. for about 12-18 hours. Optionally, an esterification catalyst is used to decrease the reaction time. About 1.2-1.4 equivalents of diol are used with 1 equivalent of acid and preferably, about 1.2-1.3 equivalents of diol with 1 equivalent of acid are used. To insure the formation of a hydroxy functional polyester, an excess of diol is used.

Typical diols that are used to form the polyester are butane diol, hexane diol, cyclohexane dimethanol, ethylene glycol or mixtures of any of the above.

Typical acids that are used to form the polyester are adipic acid, azelaic acid, sebasic acid, dodecane dicarboxylic acid, hexahydrophthalic acid, phthalic acid, terephthalic acid, isophthalic acid or anhydrides of any of these acids.

To form the carboxyl functional polyesterurethane, about 60-90 weight percent, based on the weight of polyesterurethane, of the hydroxy functional polyester, 1-5% by weight of a hydroxy containing monocarboxylic acid, 5-30% by weight of an organic polyisocyante are reacted at about 70°-95° C. for about 8-15 hours using conventional solvents and catalysts. Preferably, about 5-20% by weight of a difunctional isocyanate and 0-15% by weight of a trifunctional isocyanate are used. More preferably, about 9-15% by weight of a difunctional isocyanate and 5-10% by weight of a trifunctional isocyanate are used.

Typical diisocyanates that can be used include aliphatic, aromatic or cycloaliphatic diisocyanates such as 1,6-hexamethylene diisocyanate, isophorone diisocyanate, 4,4'-biphenylene diisocyanate, toluene diisocyanate, bis cyclohexyl diisocyanate, tetramethyl xylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane, 4,4'-diisocyanatodiphenyl ether, and the like. One preferred diisocyanate is isophorone diisocyanate since it forms a coating composition that gives a high quality finish.

Typical trifunctional isocyanate that can be used are triphenylmethane triisocyanate, 1,3,5-benzene triisocyanate, 2,4,6,-toluene triisocyanate, an adduct of trimethylol propane and tetramethyl xylene diisocyanate sold under the tradename "Cythane 3160", "Desmodur" N 3390 which is the trimer of hexamethylene diisocyanate and the like. The preferred triisocyanate is the trimer of hexamethylene diisocyanate.

Typical hydroxy functional carboxylic acids that can be used are as follows: dihydroxy succinic acid, dihydroxy benzoic acid, dimethylol propionic acid and dihydroxy benzoic acid. Dimethylol propionic acid is preferred.

Suitable multifunctional aliphatic, cycloaliphatic or aromatic epoxy compound used in the coating composition include a sorbitol based diepoxide such as GY-358, a cyclohexyl based diepoxide such as Araldite CY-184 and a sebasic acid diglycidyl ester. These epoxy compounds are available from Ciba-Geigy. Other useful epoxy compounds are adipic acid diglycidyl ester, ethylene glycol diglycidyl ether, 1,6-hexanediol diglycidyl ether, hexahydrophthalic anhydride diglycidyl ester and the like. Cyclohexyl based diepoxides are preferred.

Blends of about 0.5-3% by weight, based on the weight of the binder of the coating composition, of difunctional epoxides and 4-10% by weight of trifunctional epoxides can be used to balance the flexibility and hardness of a finish formed from the coating composition. An example of a trifunctional epoxide is trishydroxyethyl isocyanurate triglycidylether which is an adduct made from "Desmodur" N 3390 (described above) and glycidol. Other useful trifunctional epoxides include pentaerythritol glycidyl ether and triglycidyl tris(2-hydroxyethyl) isocyanurate. Trishydroxyethyl isocyanurate triglycidylether is preferred.

Typical solvents used to form the polyesterurethane and used to prepare the coating composition are as follows: xylene, toluene, methyl ethyl ketone, methyl amyl ketone, methyl isobutyl ketone, propylene carbonate, N-methyl pyrrolidone and the like.

To improve weatherability of the coating composition, in particular a clear coat of the composition, about 0.1-5%, by weight, based on the weight of the binder, of an ultraviolet light stabilizer or screeners or a combination of ultraviolet light stabilizers and screeners can be added to the clear coating composition. Typically useful ultra-violet light stabilizers and screeners are as follows:

Benzophenones such as hydroxy dodecyloxy benzophenone, 2,4-dihydroxybenzophenone, hydroxybenzophenones containing sulfonic groups and the like.

Triazoles such as 2-phenyl-4-(2',2'-dihydryoxylbenzoyl)-triazoles, substituted benzotriazoles such as hydroxy-phenyltriazoles and the like.

Triazines such as 3,5-dialkyl-4-hydroxyphenyl derivatives of triazine, sulfur containing derivatives of dialyl-4-hydroxy phenyl triazines, hydroxy phenyl-1,3,5-triazine and the like.

Benzoates such as dibenzoate of diphenylol propane, tertiary butyl benzoate of diphenylol propane and the like.

Other ultraviolet light stabilizers that can be used include lower alkyl thiomethylene containing phenols, substituted benzenes such as 1,3-bis-(2'-hydroxybenzoyl)benzene, metal derivatives of 3,5-di-t-butyl-4-hydroxy phenyl propionic acid, asymmetrical oxalic acid, diarylamides, alkylhydroxy-phenyl-thioalkanoic acid ester and the like.

Particularly useful ultraviolet light stabilizers that can be used are hindered amines of bipiperidyl derivatives such as those in Murayama, et al., U.S. Pat. No. 4,061,616, issued Dec. 6, 1977.

When used as a clear coat, the coating composition can also contain transparent pigments to improve durability and weatherability. These transparent pigments having the same or similar refractive index as the binder of the clear coat and are of a small particle size of about 0.015-50 microns. Typical pigments that can be used in the clear coat in a pigment to binder weight ratio of about 1:100 to 10:100 are inorganic siliceous pigments, such as silica pigments and have a refractive index of about 1.4-1.6.

If the coating composition is used as a conventional pigmented monocoat coating composition or as the basecoat of a clear coat/basecoat composition, the composition contains pigments in a pigment to binder weight ratio of about 1:100-200:100. It may be advantageous to use the aforementioned ultraviolet stabilizers and/or screeners in the pigmented composition.

Any of the conventional pigments used in coating compositions can be utilized such as the following: metallic oxides, such as titanium dioxide, zinc oxide, iron oxide and the like, metal hydroxide, metal flakes such as aluminum flake, chromates, such as lead chromate, sulfides, sulfates, carbonates, carbon black, silica, talc, china clay, phthalocyanine blues and greens, organo reds, organo maroons and other organic pigments and dyes.

The pigments are formulated into a mill base by mixing the pigments with a dispersing resin which may be the same as the binder of the composition or may be another compatible dispersing resin or agent. The pigment dispersion is formed by conventional means such a sand grinding, ball milling, attritor grinding, two roll milling. The mill base is then blended with the binder of the composition to form the coating composition.

The coating composition can be applied to a variety of substrates as aforementioned by conventional techniques such as spraying, electrostatic spraying, dipping, brushing, flowcoating and the like. After the composition is baked at about 135°-175° C. for about 10-30 minutes to form a finish about 2-75 microns thick. Typical clear coat/basecoat have a clear coat about 25-50 microns thick and a basecoat about 10-50 microns thick.

Other weatherable and durable coating compositions can be used as the basecoat under a clear coat of the composition of this invention. A basecoat of thermoplastic fluorinated polymers can be used such as polyvinyl fluoride, polyvinylidene fluoride (PVDF) or copolymers and terpolymers thereof. A blend of an acrylic resin and one of the above fluoropolymers also can be used. One useful blend contains about 50-80% by weight of PVDF and correspondingly 20-50% by weight of polyalkyl methacrylate. Generally, a high molecular weight (MW) PVDF resin is used having a weight average MW of about 200,000-600,000 and a relatively high MW polymethyl or polyethyl methacrylate having a MW of about 50,000-400,000.

The coating composition can be used for forming composites made for example by a shrink wrap process or from an in mold process. The coating composition is particularly useful in a lamination coating process to form a composite structure, as shown in FIG. 1 and a face sheet, as shown in FIG. 1. In the formation of composites, face sheets or laminates, the novel coating composition can be used as a clear and/or as a pigmented composition which uses any of the existing commercial pigments used for automobiles and trucks and forms a finish that is moldable and formable which is hard, glossy, weatherable and durable.

A cross section of a composite structure is shown in FIG. 1. Layer 1 which is the exterior layer of the composite is a cured layer of the novel coating composition that is a clear coating that has a glossy finish of automotive quality that has excellent weatherability, scratch and mar resistance and good gloss retention on weathering. Layer 1 is firmly adhered to paint layer 2 which is a pigmented cured layer of the novel coating composition or of another durable, formable and weatherable composition. The coating composition is of automotive quality and will withstand processing conditions and forms a finish that is weatherable and will not crack and fade. The combination of layers 1 and 2 provides the composite with an automotive quality finish that has excellent gloss, high distinctness of image, abrasion and mar resistance, acid resistance and excellent weatherability including good gloss retention.

Layer 3 is a preferred optional layer or layers of a thin layer of a thermoplastic polymer, preferably an iminated acrylic polymer, that provides intercoat adhesion of the pigmented layer 2 to layer 4 which is a flexible thermoformable polymeric material. Layer 5 is a relatively thick rigid synthetic resinous substrate, preferable a thermoplastic injection molded polymeric material, to which layer 4 is firmly adhered.

Preferably, the composite shown in FIG. 1 has the following thicknesses for each layer of the composite:
1. 10-125 micron thick layer of the glossy clear finish of the coating composition of this invention that is bonded firmly to
2. 5-75 micron thick layer of the pigment containing paint layer of the coating composition of this invention or of another coating composition that is firmly bonded to
3. (optional) 1-20 micron thick layer or layers of a thermoplastic polymer that provides intercoatadhesion that is firmly bonded to
4. 125-1250 micron thick layer of a flexible thermoformable material that is bonded to
5. 500-25,000 micron thick rigid layer of a rigid synthetic resinous material.

Figure 2:
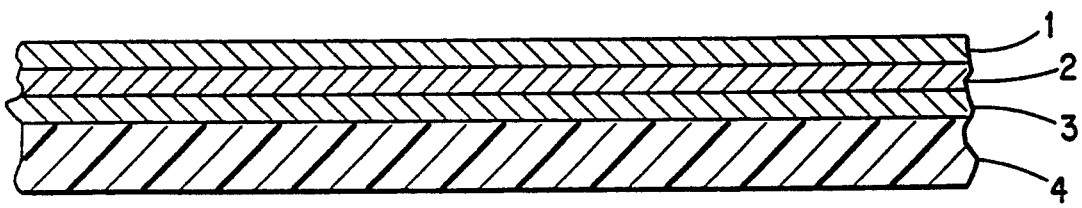
FIG. 2 shows a cross section of a thermoformable laminate or face sheet made with the novel coating composition.

In the formation of the composite, a thermoformable laminate or face sheet is first formed. FIG. 2 shows a cross section of the laminate or face sheet. The face sheet is composed of layers 1-4 of the composite before being thermoformed.

The face sheet preferably has the following thickness for each of the layers used:
1. 10-125 micron thick layer of the glossy clear finish of the coating composition of this invention that is bonded firmly to
2. 5-75 micron thick layer of the pigment containing paint layer of the coating composition of this invention or of another coating composition that is firmly bonded to
3. (optional) 1-20 micron thick layer or layers of a thermoplastic polymer that provides intercoat adhesion that is firmly bonded to
4. 125-1250 micron thick layer of a flexible thermoformable material.

Figure 3:
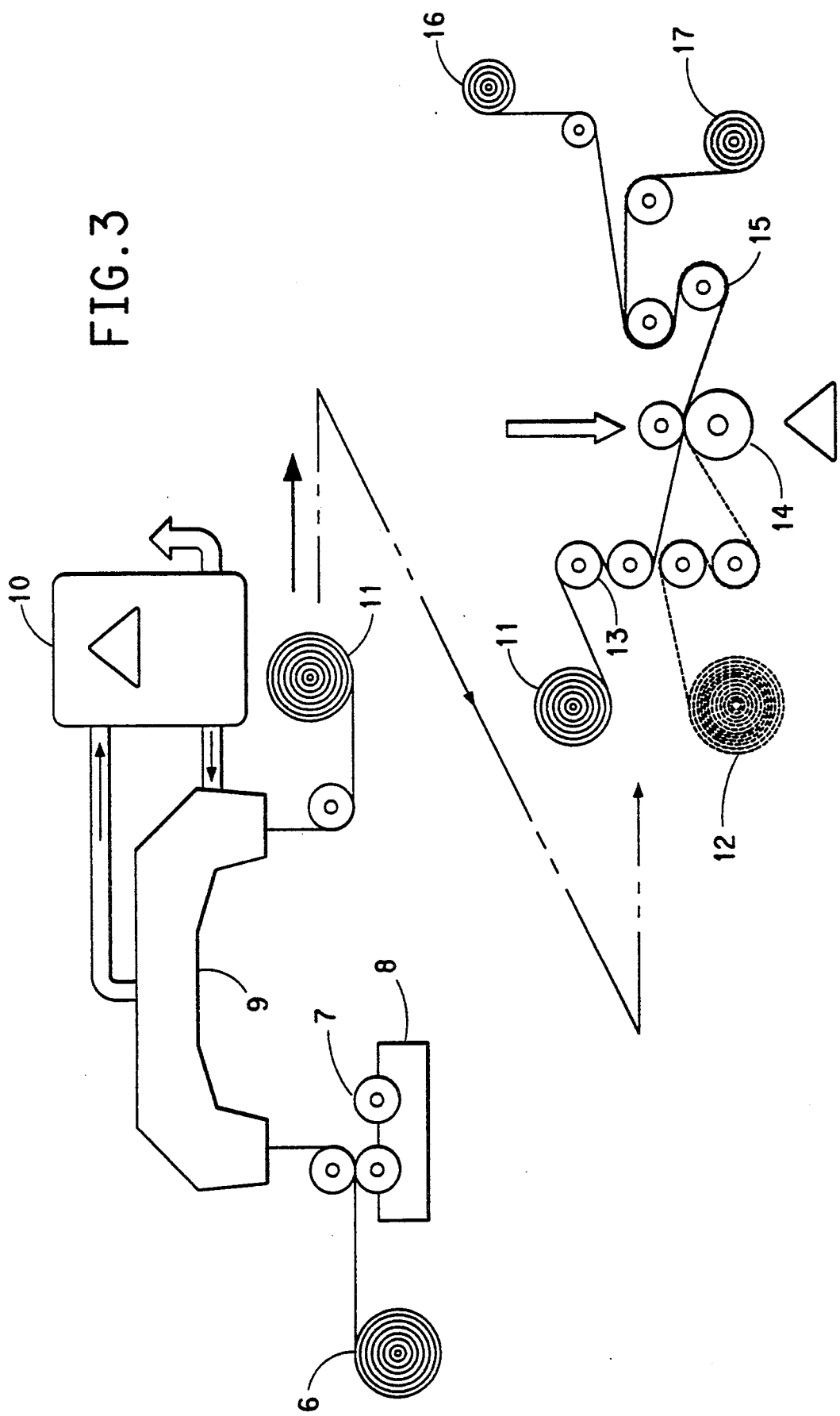
FIG. 3 shows roller coating of the novel coating composition onto a polyester film and the formation of a laminate or face sheet.

FIG. 3 shows a process for making the laminate or face sheet. A flexible polymeric carrier sheet, 6 preferably a polyester film, typically a "Mylar" 200A polyethylene terephthalate film about 50 microns thick, is fed through a 3 roll roller coater 7 containing a clear coating composition 8 of this invention and by reverse roller coating about a 10-125 micron thick coating (dry basis) is applied. Coating line speeds of about 5-25 meters/minute are used. The coated film is then passed through the oven 9, preferably having multiple heating zones; typically three heating zones are used. The first zone is at about 30°-50° C., the middle zone is at about 90°-100° C. and the last zone is at about 140°-160° C. Typically, the oven is about 40 meters in length and the coated sheet is in the oven about 5 minutes. Generally, oven drying temperatures and line speed are adjusted so that the resulting clear layer is dried and at least partially cured before being wound onto the roll 11. A solvent incinerator 10 is used to incinerate solvent fumes from the coating composition. The coated film is then wound into roll 11. The roller coater 7 is filled with a pigmented coating composition instead of the clear composition and the process is repeated to apply about 5-75 micron thick coating (dry basis) of the pigmented coating or basecoat over the clear coat layer on the film to form a polyester film having a clear coat layer and a basecoat layer. The basecoat layer is dried as above. Optionally, the basecoat layer is coated with a 1-25 micron thick layer (dry basis) of a size layer of thermoplastic polymeric material using the same process and dried under the same conditions.

The resulting coated polyester film is then laminated to a flexible thermoformable polymeric sheet material 12 about 250-1250 microns in thickness with the coated side of the polyester film being contacted with the thermoformable polymeric sheet material. The roll of coated polyester film 11 and a roll of the thermoformable polymeric sheet material are fed at a line speed of about 3-15 meters/minute through guide rollers 13 and then through two nip rollers 14 with the top roller heated to a temperature of about 150°-250° C. and using a pressure of about 10-75 kg/linear cm. The resulting laminate is passed around chill roll 15 and the polyester film is separated from the face sheet and wound onto roll 16 and the resulting face sheet is wound into roll 17.

FIG. 4 shows the formation of the composite structure. A section of the face sheet is cut and then is thermoformed into into a shaped structure by placing it in a vacuum former 18 containing heat lamps 19 and the face sheet is heated to about 100°-180° C. The sheet is then vacuum formed into a shaped structure 20 having a painted surface which can be used in an injection molding process or in another molding process to form an auto or truck part. The shaped structure 20 is positioned in a conventional injection molding machine 21 in which a thick layer of a thermoplastic resin is injection molded to form a backing layer about 500-25,000 microns in thickness. The resulting part 22 is useful for autos and trucks and has a surface that is smooth and glossy, has an excellent distinctness of image and good color uniformity and in general meets all the requirements of an automotive finish.

The glossy clear finish and the color coat layer provide the laminate with an exterior decorative finish that is acceptable for automobiles and trucks. The finish must have the following properties to be useful as an automotive or truck finish: a gloss measured at 20° of at least 80 and measured at 60° of at least 90, a distinctness of image (DOI) of at least 80, cleanability, acid spot resistance, hardness of at least 6 Knoops, chip resistance, impact strength of at least 20 inch pounds measured at room temperature and at −29° C., excellent paint adhesion, resistance to water and humidity exposure and excellent outdoor weatherability.

The following is a description of the test methods used to determine the above properties. Certain test methods identified below are publicly available standard industry specifications and test methods which are incorporated herein by this reference.

Gloss is measured by specular reflectance of a beam of light at angles of 20° and 60°. Specular reflectance is measured before the finished painted surface is buffed and waxed. A Byk-Mallinckrodt "multigloss" or "single gloss" gloss meters are used for measuring specular gloss of the finish. These gloss meters give values equivalent to those obtained from ASTM Method D-523-67. The preferred test method is described in GM Test Specification TM-204-A.

Distinctiveness-of-Image (DOI) is a measurement of the clarity of an image reflected by the finish. DOI is measured from the angle of reflection of a light beam from a spherical surface. DOI is measured by the Hunterlab Model No. D47R-6F Doigon Gloss Meter. A test panel is placed on the instrument sensor and the sharpness of the reflected image is measured. Details of the DOI test procedure are described in GM Test Specification TM-204-M.

Cleanability is tested according to GM Test Specification TM 31-11 in which the painted plastic part is subjected to ten rubs with cheesecloth saturated with 9981062 Naphtha or currently used and approved cleaning solvents. There should be no evidence of staining, discoloration, or softening of the painted surface and no evidence of color transfer from the test part to the cloth. One rub consists of one forward and backward motion.

The Acid Spotting Resistance Test requires the painted part to withstand exposure to 0.1 N sulfuric acid for 16 hours without any evidence of staining, discoloration, or softening of the paint.

Hardness is measured by a standard Knoop Hardness Test.

Chip resistance is determined by a Gravelometer Test described in SAE J-400. The painted part as received and after 3 and 6 months Florida exposure, described below, is tested at −23° C. and must have a minimum rating of 8 as determined by F. B. Gravelometer Rating Chart.

Impact strength of a painted part is tested at room temperature by the Gardener Test and by the Rosand Test at −29° C.

Paint Adhesion of a painted part is determined by a standard Tape Adhesion Test described in GM Test Specification TM 55-3. According to this test, a tape is pressed down over an X-shaped cut in the paint coat and the tape is then removed to test the amount of peeling. The test requires a minimum of 99% of the paint remaining in the tape test area.

Resistance to Water and Humidity Exposure is measured by several tests. In one test, the finished part is exposed to 96 hours of humidity exposure at 100% relative humidity and 38° C. in a humidity cabinet defined in GM test specification TM 55-3, and a two-hour water immersion test at 38° C. according to GM test specification TM 55-12. The resulting paint panel should show no evidence of blistering when examined one minute after removal from the test cabinet and shall withstand the Paint Adhesion Test described above.

The Paint Adhesion Test is performed within one minute after removal from either test cabinet. In a second test, the painted panel should withstand 15 cycles of the Moisture-Cold Cycle Test defined in GM test specification TM 45-61A, without any visible signs of cracking or blistering. After 15 cycles, the paint panel is exposed to 96 hours of the humidity exposure described above, followed by the Paint Adhesion Test also described above. The panel is expected to pass both tests. The Paint Adhesion Test is performed within one minute after removal from the humidity environment. One cycle consists of 24 hours and 100% relative humidity at 38° C., 20 hours at −23° C., and four hours at room temperature.

For outdoor weatherability, painted panels are exposed for 3 years in Florida facing south in a black box positioned 5° from the horizontal. The painted panels should retain 40% of their original gloss and there should be no blistering or fading of the paint.

The finish of the clear and the basecoat of the laminate must be sufficiently flexible at thermoforming temperatures and must have sufficient durability to withstand thermoforming and the molding process without embrittling, cracking or otherwise degrading the finish. The finish must be thermoplastic and flexible and must retain its gloss and other appearance properties after processing.

To be useful in the aforementioned process for forming a composite structure, a clear coat of the coating composition of this invention must be able to withstand an elongation of at least 100% at a film thickness of about 10-25 microns at 100° C.

The flexible polymeric carrier sheet with the clear layer and the pigmented layer can be laminated directly to the flexible thermoformable polymeric material to form a laminate. The pigmented layer is placed in contact with the flexible thermoformable material. Often it is convenient or necessary to apply a thin size layer or several size layers to the pigmented layer to improve or enhance adhesion to the flexible material. Typical polymeric materials useful for the size layer are iminated polyalkyl acrylate and methacrylates, polyalkyl acrylates, polyalkyl methacrylates, vinyl chloride polymers, polyurethanes, polyimides, and mixtures of the above. One preferred size is a polymer of methyl methacrylate, butyl methacrylate, butyl acrylate, methacrylic acid iminated with propyleneimone.

The thermoformable flexible layer of the composite is prepared from standard automotive grade resins. These resins typically are compounded from thermoplastic resins, synthetic rubbers, additives, antioxidants and pigments.

The following are thermoformable resins of typical rubbers that are compounded with the polypropylene resins: ethylene/propylene rubbers or ethylene/propylene/maleate rubbers. The compounded resins usually contain pigments such as carbon black, calcium carbonate, silica, talc and other filler or reinforcing pigments. Colored pigments described above can also be used. The specific formula for the compounded resins varies according to each supplier but each composition must meet the structural specifications such as flexural modulus, tensile strength, elongation, tear strength and hardness and process constraints such as melt flow and mold shrinkage.

Particularly useful thermoformable resins used for the flexible layer are polyolefins such as polyethylene, polypropylene, acylonitrile/butadiene/styrene polymers, polystyrene, styrene/acrylonitrile copolymers and glycol modified polyethlene terephthalate. Typically, a cyclohexane dimethanol modified polyethylene terephthalate can be used.

The layer of flexible thermoformable polymeric material can be formed into a 125-1250 micron thick sheet using conventional techniques and equipment such as extrusion techniques and equipment. Resins with melt flow indexes of about 0.5-8.0 g/10min. can be used but resins with melt flow indexes of about 0.5-2.0 g/10 min. are preferred.

The conditions used to form the flexible sheet are such that a sheet with a smooth "Class A" surface is formed and the sheet has low internal stresses. Stresses in the flexible sheet are measured by cutting a 4×4 inch section of the sheet and laying the section on a flat surface. The edges and the corners of the section should lie flat for an unstressed film.

The resin used to form the rigid layer of the composite is an automotive quality resin generally having a flexural modulus of about 175-2100 MPa melt flow of about 0.5-8.0 g/10 min. Preferably, the resin has a melt flow of about 4.0-8.0 g/10 min. Any of the aforementioned resin used for the flexible layer can be used that have the above properties.

Also, other resinous materials can be used for the rigid layer such as RIM, reinforced injection molded materials which crosslink on curing. Since the surface of the composite of this invention is determined by the surface of the flexible layer, only the flexible layer need be of a high quality resin while the rigid layer of the composite can be of a lower quality resin. For example, the rigid layer may contain gel particles which would not affect the appearance or the structural integrity of a resulting part formed from the composite.

The ability to separate the surface characteristics from the resin used to form the rigid layer of the composite allows for the formation of greatly improved parts. For example, fiberglass reinforced or other filler reinforced resins can be used for the resin for the rigid layer of the composite and stronger more rigid parts can be made than has heretofore been possible.

The composite of this invention provides automotive manufacturers with many advantages over prior art compositions. Adhesion problems within the recessed portions of a part are minimized, solvent emissions associated with spray painting are eliminated, the need for expensive hangers and jigs to maintain shape of a plastic part during baking of an applied paint are eliminated and the need for a primer which is required with a conventional paint spraying process also is eliminated. Additionally, the composite has a unique set of characteristics that make it superior to conventional injection molded and spray painted parts.

The following Examples illustrate the invention. All parts and percentages are on a weight basis unless otherwise indicated and molecular weights, number average $M_n$ and weight average $M_w$ are determined by gel permeation chromatography using polystyrene as a standard.

EXAMPLE 1

A hydroxy functional polyester was prepared by charging the following constituents into a polymerization vessel equipped with a heating mantle, reflux condenser, thermometer, nitrogen inlet and stirrer:

|  | Parts by Weight |
| --- | --- |
| Portion 1 | |
| 1,4-Cyclohexane dimethanol | 1897.1 |
| Hexahydrophthalic anhydride | 1254.6 |
| Dodecanedioic acid | 212.9 |
| Adipic acid | 135.3 |
| Toluene | 70.0 |
| Portion 2 | |
| Xylene | 500.0 |
| Methyl ethyl ketone | 300.0 |
| Total | 4369.9 |

Portion 1 was charged into the polymerization vessel and heated under nitrogen to 240° C. and held at this temperature. Water was removed until the acid number of the mixture reached 4. Portion 2 was then added and the resulting polyester solution was cooled to room temperature. The resulting polymer solution had the following characteristics:

| Gallon weight | 8.8 lbs/gal |
| --- | --- |
| % Weight solids | 79% |
| % Volume solids | 72.8% |
| Hydroxy No. of polymer | 100–120 |
| $M_w$ of polymer | 2300 |
| $M_n$ of polymer | 800 |

A carboxyl functional polyesterurethane was prepared by charging the following constituents into a polymerization vessel equipped as above:

|  | Parts by Weight |
| --- | --- |
| Portion 1 | |
| Hydroxy functional polyester solution (prepared above) | 400.0 |
| Dimethylol propionic acid | 8.6 |
| Methyl ethyl ketone | 250.0 |
| Portion 2 | |
| Dibutyl tin dilaurate | 0.8 |
| Isophorone diisocyanate | 64.6 |
| "Desmodure" N-3390 (trimer of hexamethylene diisocyanate) | 17.5 |
| TOTAL | 741.5 |

Portion 1 was charged into the polymerization vessel and heated to its reflux temperature and held at this temperature for about 30 min. to remove any trace of water. The reaction mixture was cooled to 80° C. and Portion 2 was added at a uniform rate over a 1 hour period. The reaction mixture was held at 80° C. until all of the isocyanate was consumed.

The resulting polyesterurethane solution had the following characteristics:

| Gallon weight | 8.2 lbs/gal |
| --- | --- |
| % Weight solids | 54.7% |
| % Volume solids | 45.0% |
| Acid No. | 9–13 |
| Inherent Viscosity | 0.156–0.165 Dl/gm |
| $M_n$ of polymer | 7,000 |
| $M_w$ of polymer | 84,000 |

CLEAR COATING COMPOSITION 1

A clear coating composition was formulated by thoroughly blending the following constituents:

|  | Parts by Weight |
| --- | --- |
| Polyesterurethane polymer solution (prepared above) | 200.0 |
| Araldite CY-184 (epoxy resin from Ciba-Geigy diglycidyl ester of hexahydro phthalic anhydride) | 8.7 |
| "Tinuvin" 292 [bis(1,2,2,6,6-pentamethyl-4-piperidinyl sebacate)] | 1.3 |
| "Tinuvin" 1130 [reaction product of beta-3-(2H benzotriazol-2-yl)-4-hydroxy-5-tert-butyl phenyl propionic acid methyl ester and polyethylene glycol 300] | 3.7 |
| Methyl ethyl ketone | 100.0 |
| Total | 313.7 |

CLEAR COATING COMPOSITION 2

|  | Parts by Weight |
| --- | --- |
| Polyesterurethane polymer solution (prepared above) | 200.0 |
| Trifunctional epoxide solution (65% solids in ethyl acetate of "Desmodur" N-3390-glycidol adduct) | 9.4 |
| "Tinuvin" 292 [bis(1,2,2,6,6-pentamethyl-4-piperidinyl sebacate)] | 1.3 |
| "Tinuvin" 1130 (described above) | 3.6 |
| Xylene | 50.0 |
| Total | 264.3 |

Each of the above prepared Clear Coating Compositions 1 and 2 are separately coated onto 125 micron thick "Mylar" polyester film with a knife blade and then baked at 150° C. for about 20 minutes. Each of the resulting finishes was about 38 microns thick and was clear, hard and glossy and had the following properties:

|  | Clear Coating Composition 1 | Clear Coating Composition 2 |
| --- | --- | --- |
| 20° Gloss | 85 | 85 |
| Distinctness of Image (DOI) | 85 | 85 |
| Tukon Hardness (knoop) | 11.9 | 11.5 |
| Chemical Resistance | | |
| 5% NAOH Solution | 10 | 8 |
| 10% $H_2SO_4$ | 10 | 10 |

(For Chemical Resistance best = 10, worst = 0)

SILVER METALLIC BASECOAT

|  | Parts by Weight |
| --- | --- |
| Portion 1 | |
| Polyesterurethane polymer solution (prepared above) | 80.00 |
| Toluene | 20.00 |
| Aluminum paste (62% aluminum flake in mineral spirits/naphthol) | 9.40 |
| Portion 2 | |
| Trifunctional epoxide - described above | 1.54 |
| Surfactant (Resiflow S) | 0.10 |
| Total | 111.04 |

Portion 1 was charged into a mixing vessel and thoroughly mixed and then portion 2 was added and mixed with portion 1 to form a basecoating composition having a pigment to binder ratio of 15/100.

Clear Coating Composition 2 was coated onto 2 mil thick "Mylar D" using a knife blade. The coating was then baked for 10 min. at 175° C. to give a clear, hard and glossy clear coat. The above Silver Metallic Basecoat was then applied on top of the dried clear coat using a knife blade and was then baked for 10 min. at 175° C. to give a clearcoat/basecoat coated "Mylar". The clearcoat/basecoat coated "Mylar" Sheet was then laminated to a 20 mil sheet of ABS (acrylonitrile-butadiene-styrene). Before the lamination step the ABS was coated with an iminated acrylic size and the size dried by baking for 10 min. at 82° C. After the lamination step the "Mylar" was stripped off of the clearcoat to give a clearcoat/basecoat on a flexible ABS facesheet.

The above iminated acrylic size is a 35% solids solution in 30/70 isopropanol/toluene solvent of a polymer of methyl methacrylate/butyl methacrylate/butyl acrylate/methacrylic acid (35.3/45.7/9/10) iminated with propyleneimine.

The following lamination conditions were used:

| Roll Temperature | 168° C. |
| --- | --- |
| Belt Speed | 1.5 meters/minute |
| # of Passes | 2 |

The clearcoat/basecoat has similar properties to above Clear Coating Compositions 1 and 2.

Laminates can be formed by following the following procedure:

Coat Clear Coating Composition 1 onto a 50 micron thick high gloss "Mylar" polyester film by a reverse roll coater (illustrated in FIG. 2). Cure the coating on the polyester sheet by passing it through a multi-zone air drying oven having three heating zones spaced apart axially along the length of the carrier, with each drying zone having a progressively higher temperature. Pass the coated polyester sheet through the heating zones of a line speed of about 8 meters per minute; total oven length about 40 meters. Temperatures of the three heating zones should be as follows: zone 1: 38° C., Zone 2: 93° C., Zone 3: 150° C.

Apply the above prepared Silver Metallic basecoat to the clear coating by using the above coating procedure to provide a base coat about 15-20 microns thick and then apply the iminated acrylic size layer.

Laminate the base coat of the resulting clear coat/base coat coated polyester film as illustrated in the laminating operation of FIG. 3, to a 500 micron thick ABS backing sheet coated with the above iminated acrylic size. In the laminating operation, run the backing sheet and the paint coated polyester film carrier at a lineal speed of 5 meters per minute, and operate the laminating drum at a temperature of 177° C. and applying a force of about 54 kg/lineal cm to form the face sheet.

Strip the resulting face sheet from the polyester film and thermoformed into a complex three-dimension shape (illustrated in FIG. 4). In the thermoforming process, heat the face sheet to a temperature of about 121° C. to soften the face sheet. Place the heated face sheet over a pressure assist vacuum former buck and draw a vacuum against the buck on the ABS side of the face sheet and apply 2.1 kg/cm² gauge of air pressure on the clear coat side of the laminate to form the heated face sheet into the three dimensional shape structure.

Trim the resulting thermoformed laminate then to fit in the mold cavity of a plastic injection molding machine (see FIG. 4). A composite is then formed. Inject the ABS resin into the mold behind the thermoformed laminate fusing the resin to the ABS base of the laminate to form the structure about 2.5-3.75 mm thick. Operate the mold at the normal melt temperature for the resin. The structure formed should be an integral plastic composite with a defect-free paint coat on the exterior surface of the composite that has a desirable automotive quality appearance and excellent physical properties.

I claim:

1. A composite useful as an exterior vehicle part comprising the following layers of components:
   a. 10-125 micron thick layer of a glossy clear thermoplastic finish of a cured coating composition bonded firmly to
   b. 5-75 micron thick layer of a thermoplastic pigment containing layer of a cured coating composition bonded to
   c. 125-1250 micron thick layer of a flexible thermoformable material that is bonded to
   d. 500-25,000 micron thick layer of a rigid synthetic resinous material;

wherein the coating composition before being cured comprises about 10-70% by weight binder solids and correspondingly about 90-30% by weight organic liquid carrier, wherein the binder consists of about (1) 80-99 percent by weight of a carboxyl functional polyesterurethane having a weight average molecular weight of about 80,000 to 200,000 and is the reaction product of about 60-90 percent by weight of a hydroxy functional polyester, about 1-5 percent by weight of a hydroxy containing carboxylic acid containing one carboxyl group and two hydroxyl groups, and about 5-30 percent by weight of an organic polyisocyanate selected from the group of aliphatic, cycloaliphatic or aromatic diisocyanate and contains up to 15 percent by weight, based on the weight of the polyesterurethane, of an organic triisocyanate; wherein the hydroxy functional polyester is the reaction product of about 1.2-1.4 equivalents of a diol of the formula HOROH and about 1 equivalent of dicarboxylic acid of the formula $R^1(COOH)_2$ or an anhydride of such an acid where R is an aliphatic cycloaliphatic or aromatic hydrocarbon radical having 2-6 carbon atoms and $R^1$ is an aliphatic, cycloaliphatic or aromatic hydrocarbon radical having 6-12 carbon atoms and (2) 1-20 percent by weight of multifunctional aliphatic, cycloaliphatic or aromatic epoxy compound which crosslinks with the polyesterurethane upon curing of the composition.

2. The composite of claim 1 wherein clear layer and the pigmented layer form the exterior surface of the composite and have a gloss of at least 80 measured at 20° and a distinctness of image of at least 80.

3. The composite of claim 1 in which the clear layer contains plasticizers, ultraviolet light screeners, ultraviolet light stabilizers, microgel, flow control agent and mixtures of any or all of the above.

4. The composite of claim 3 in which the pigment containing layer includes the same resinous components the clear finish.

5. The composite of claim 1 in which the pigment containing layer is a blend of a thermoplastic fluorinated polymer and an acrylic polymer.

6. The composite of claim 5 in which the fluorinated polymer is polyvinylidene fluoride and the acrylic polymer is polyalkylmethacrylate.

7. The composite of claim 1 in which the the pigmented layer contains plasticizers, ultraviolet light screeners, ultraviolet light stabilizers, microgel, flow control agent and mixtures of any or all of the above and contains pigment in a pigment to binder ratio of about 1:100–200:100 wherein the binder comprises the film forming constituents of the coating composition.

8. The composite of claim 1 having at least one size layer positioned between the pigmented layer and the layer of flexible thermoformable material, wherein the size layer is about 1–25 microns thick and is selected from the group consisting of polyalkyl acrylates, polyalkyl methacrylates, iminated polyalkyl acrylates, iminated polyalkylmethacrylates, vinylchloride polymers, polyurethanes, polyimides, and any mixtures thereof.

9. The composite of claim 1 in which the flexible thermoformable polymeric material is selected from the group of thermoplastic polyolefin, acrylonitrile-butadiene-styrene terpolymer, polystyrene, styrene-acrylonitrile copolymer and glycol modified polyethylene terephthate.

10. The composite of claim 9 in which the flexible thermoformable polymeric material comprises a polyolefin of polypropylene or polyethylene.

11. The composite of claim 9 in which the flexible layer of thermoformable polyolefin comprises an extruded sheet of a compounded mixture of polypropylene, a synthetic elastomeric resin, pigments and additives.

12. The composite of claim 1 in which the rigid synthetic resinous layer comprises a thermoformable polymeric material having a flexural modulus of about 175–2100 MPa and has a melt flow rate of about 0.5–8.0 g/10 min. is selected from the group consisting of thermoplastic polyolefin, acrylonitrile-butadiene-styrene terpolymer, polystyrene and styrene-acrylonitrile polymer and copolymers thereof.

13. The composite of claim 12 in which the rigid synthetic resinous layer comprises thermoformable polyolefin of polyethylene or polypropylene.

14. A laminate useful for making an exterior vehicle part comprising the following layers of components:
   a. 10–125 micron thick layer of a glossy, clear thermoplastic finish of a cured coating composition bonded firmly to
   b. 5–75 micron thick layer of a thermoplastic pigment containing layer of a coating composition bonded to
   c. 125–250 micron thick layer of a flexible thermoformable material;

wherein the coating composition before being cured comprises about 10–70% by weight binder solids and correspondingly about 90–30% by weight organic liquid carrier, wherein the binder consists of about (1) 80–90 percent by weight of a carboxyl functional polyesterurethane having a weight average molecular weight of about 80,000 to 200,000 and is the reaction product of about 60–90 percent by weight of a hydroxy functional polyester, about 1–5 percent by weight of a hydroxy containing carboxylic acid containing one carboxyl group and two hydroxyl groups, and about 5–30 percent by weight of an organic polyisocyanate selected from the group of aliphatic, cycloaliphatic or aromatic diisocyanate and contains up to 15 percent by weight, based on the weight of the polyesterurethane, of an organic triisocyanate; wherein
the hydroxy functional polyester is the reaction product of about 1.2–1.4 equivalents of a diol of the formula HOROH and about 1 equivalent of dicarboxylic acid of the formula $R^1(COOH)_2$ or an anhydride of such an acid where R is an aliphatic, cycloaliphatic or aromatic hydrocarbon radical having 2–6 carbon atoms and $R^1$ is an aliphatic, cycloaliphatic or aromatic hydrocarbon radical having 6–12 carbon atoms and (2) 1–20 percent by weight of multifunctional aliphatic, cycloaliphatic or aromatic epoxy compound which crosslinks with the polyesterurethane upon curing of the composition.

* * * * *